(12) United States Patent
Dill

(10) Patent No.: US 11,147,218 B2
(45) Date of Patent: Oct. 19, 2021

(54) PLANT BULB PROTECTION ASSEMBLY

(71) Applicant: Nora Dill, S. Ozone Park, NY (US)

(72) Inventor: Nora Dill, S. Ozone Park, NY (US)

(*) Notice: Subject to any disclaimer, the term of this patent is extended or adjusted under 35 U.S.C. 154(b) by 259 days.

(21) Appl. No.: 16/414,824

(22) Filed: May 17, 2019

(65) Prior Publication Data

US 2020/0359574 A1 Nov. 19, 2020

(51) Int. Cl.
*A01G 13/02* (2006.01)

(52) U.S. Cl.
CPC ..... *A01G 13/0243* (2013.01); *A01G 13/0237* (2013.01)

(58) Field of Classification Search
CPC ............ A01G 13/0206; A01G 13/0212; A01G 9/027; A01G 9/029; A01G 9/0291; A01G 9/0293; A01G 9/0295; A01G 13/02; A01G 13/0237; A01G 13/0243
See application file for complete search history.

(56) References Cited

U.S. PATENT DOCUMENTS

| | | | |
|---|---|---|---|
| 3,384,992 A | 5/1968 | Heffron | |
| 4,248,014 A * | 2/1981 | Williames | A01C 11/02 47/86 |
| D298,904 S | 12/1988 | Mourich | |
| 5,669,177 A | 9/1997 | Frounfelker | |
| 6,012,249 A | 1/2000 | Cheney | |
| 6,038,810 A | 3/2000 | Kocsis, Jr. | |
| 6,061,953 A * | 5/2000 | Chubb | A01G 13/02 47/28.1 |
| 6,067,747 A | 5/2000 | Reed | |
| 8,683,741 B2 | 4/2014 | Castagno | |
| 2006/0150477 A1 | 7/2006 | Mayer | |
| 2016/0120140 A1* | 5/2016 | Stevens | A01G 31/02 |
| 2016/0309670 A1* | 10/2016 | Chen | A01G 27/02 |

* cited by examiner

*Primary Examiner* — Joshua J Michener
*Assistant Examiner* — Henry Hooper Mudd

(57) ABSTRACT

A plant bulb protection assembly includes a tube has a first end that is tapered to penetrate ground. The tube has an inside diameter that is sufficient to accommodate a plant bulb and surround the plant bulb when the tube is inserted into ground. The tube is comprised of a resilient material to inhibit being chewed or otherwise penetrated by a rodent thereby protecting the plant bulb from being eaten by the rodent. A cage is coupled to the tube to inhibit rodents from entering the tube from above the ground. A retainer is coupled to the tube and a grapple is movably coupled to the tube. The grapple is positioned on an opposite side of the tube with respect to the retainer. Moreover, the grapple releasably engages the retainer on an adjacent one of the tubes with respect to the tube on which the grapple is positioned.

6 Claims, 4 Drawing Sheets

PLANT BULB PROTECTION ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to protection devices and more particularly pertains to a new protection device for protecting plant bulbs from being eaten by rodents.

BRIEF SUMMARY OF THE INVENTION

An embodiment of the disclosure meets the needs presented above by generally comprising a tube has a first end that is tapered to penetrate ground. The tube has an inside diameter that is sufficient to accommodate a plant bulb and surround the plant bulb when the tube is inserted into ground. The tube is comprised of a resilient material to inhibit being chewed or otherwise penetrated by a rodent thereby protecting the plant bulb from being eaten by the rodent. A cage is coupled to the tube to inhibit rodents from entering the tube from above the ground. A retainer is coupled to the tube and a grapple is movably coupled to the tube. The grapple is positioned on an opposite side of the tube with respect to the retainer. Moreover, the grapple releasably engages the retainer on an adjacent one of the tubes with respect to the tube on which the grapple is positioned.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
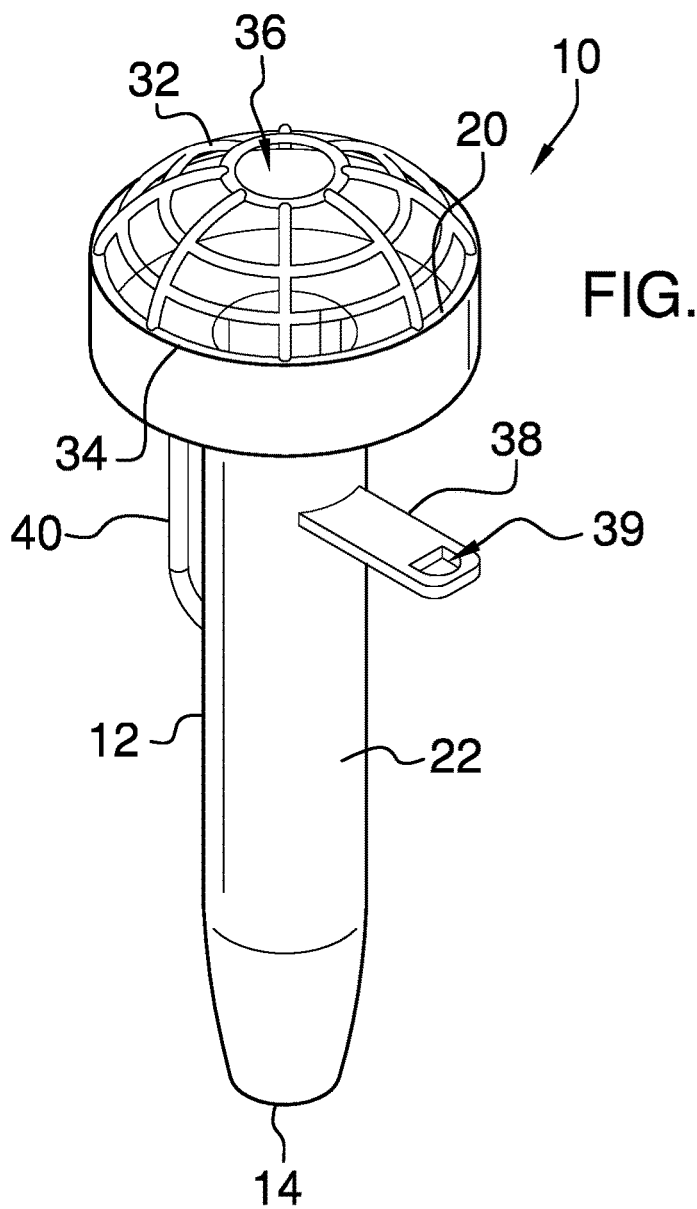
FIG. 1 is a top perspective view of a plant bulb protection assembly according to an embodiment of the disclosure.
Figure 2:
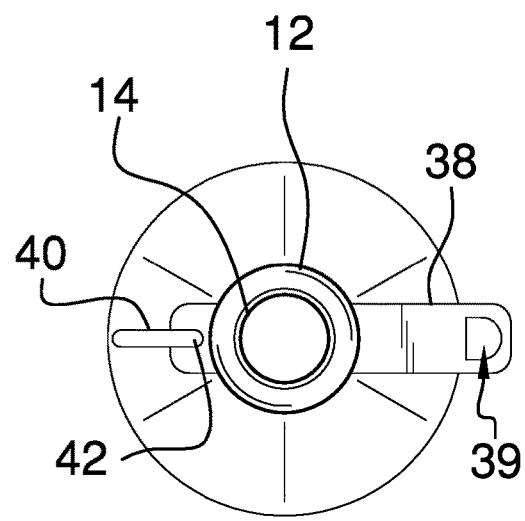
FIG. 2 is a bottom view of an embodiment of the disclosure.
Figure 3:
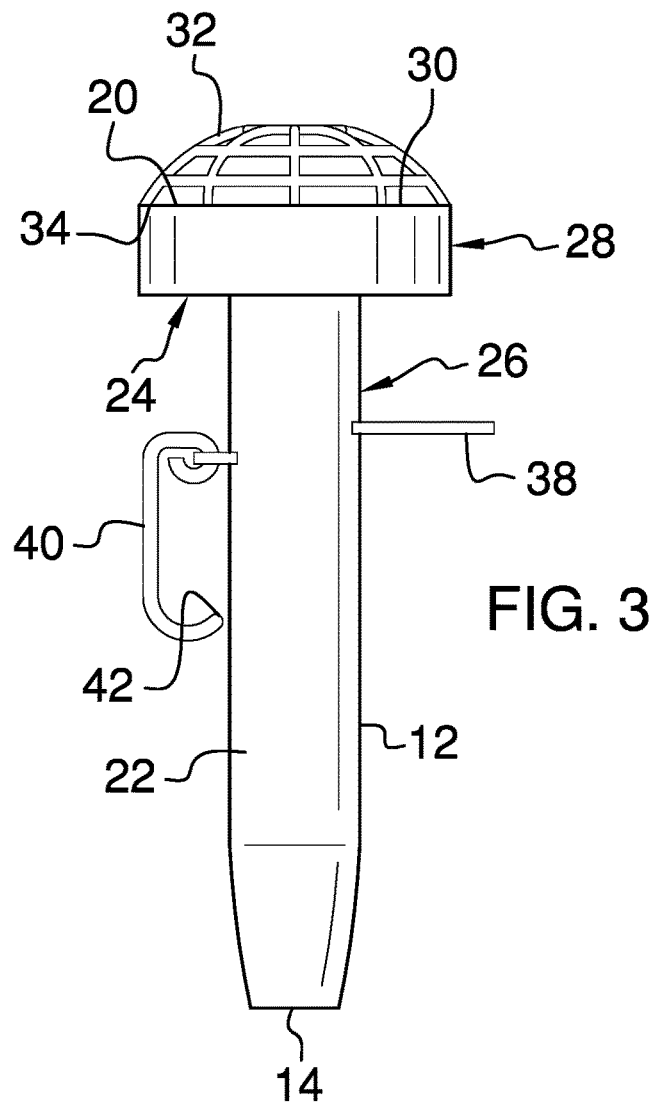
FIG. 3 is a front view of an embodiment of the disclosure.
Figure 4:
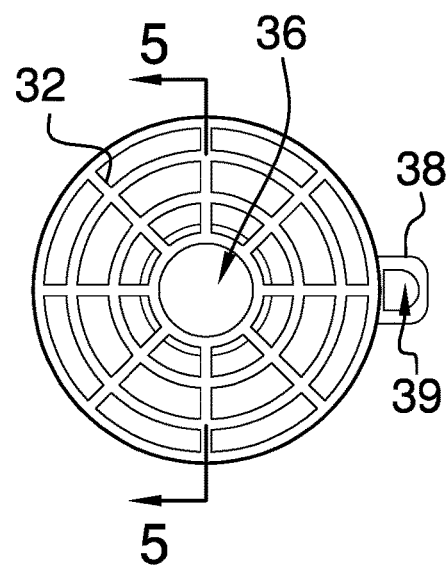
FIG. 4 is a top view of an embodiment of the disclosure.
Figure 5:
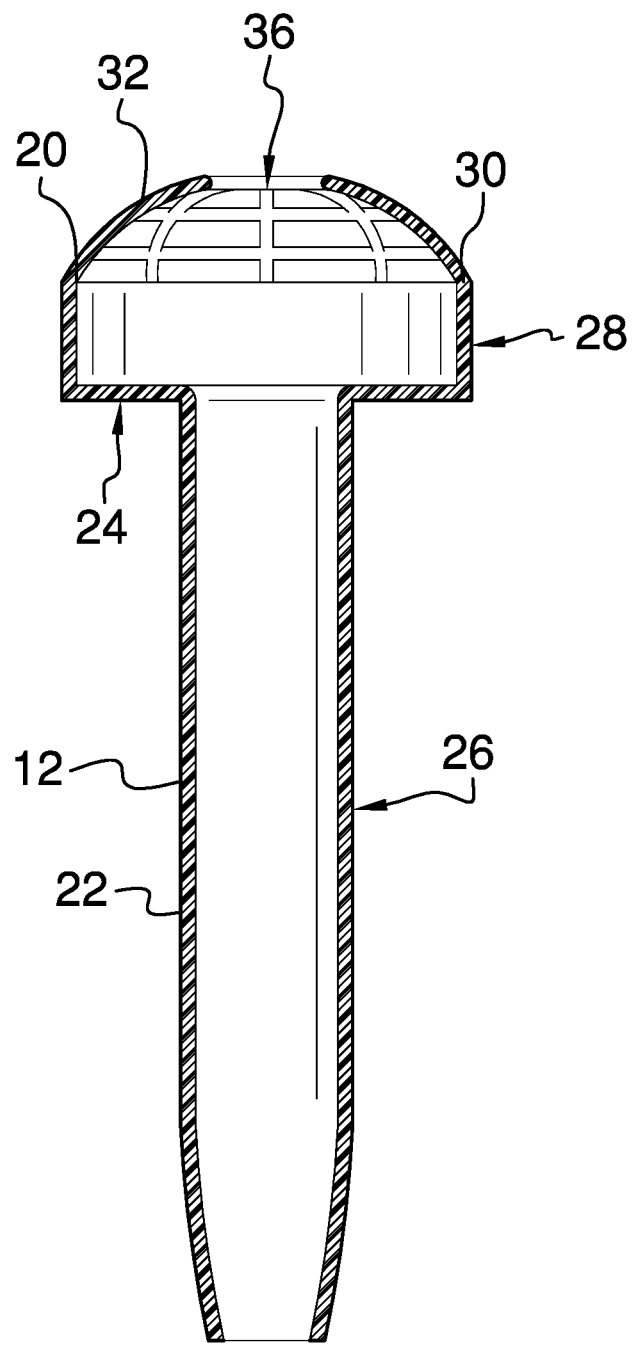
FIG. 5 is a cross sectional view taken along line 5-5 of FIG. 4 of an embodiment of the disclosure.
Figure 6:
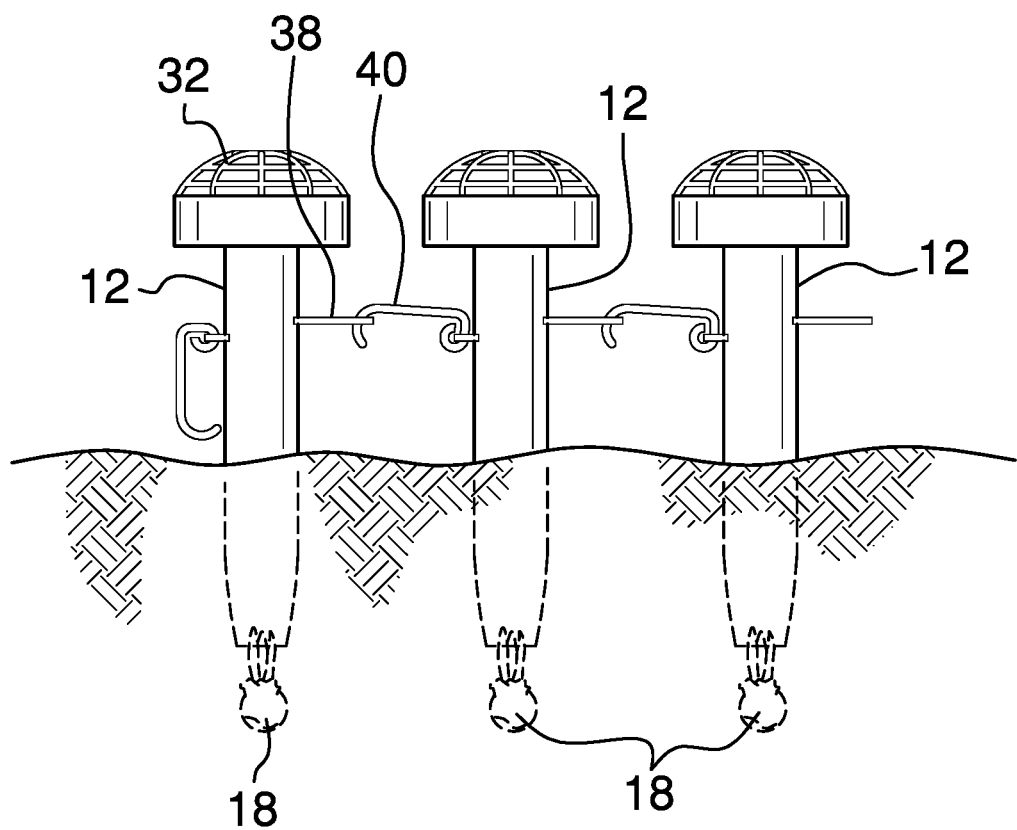
FIG. 6 is a perspective in-use view of an embodiment of the disclosure.

With reference now to the drawings, and in particular to FIGS. 1 through 6 thereof, a new protection device embodying the principles and concepts of an embodiment of the disclosure and generally designated by the reference numeral 10 will be described.

As best illustrated in FIGS. 1 through 6, the plant bulb protection assembly 10 generally comprises a tube 12 that has a first end 14 that is tapered to penetrate ground 16. The tube 12 has an inside diameter that is sufficient to accommodate a plant bulb 18. In this way the tube 12 surrounds the plant bulb 18 when the tube 12 is inserted into ground 16. The plant bulb 18 may be tulip bulb or any other plant bulb 18.

The tube 12 is comprised of a resilient material to inhibit being chewed or otherwise penetrated by a rodent thereby protecting the plant bulb 18 from being eaten by the rodent. The tube 12 has a second end 20 and an outer wall 22 extending between the first 14 and second 20 ends, and the outer wall 22 angles inwardly adjacent to the first end 14. The outer wall 22 has a horizontal portion 24 that is oriented perpendicular to and extends outwardly from a tubular portion 26 of the tube 12. Additionally, the horizontal portion 24 is spaced from the second end 20. The outer wall 22 has a vertical portion 28 extending upwardly from the horizontal portion 24. The vertical portion 28 has a distal edge 30 with respect to the horizontal portion 24 defining the second end 20 of the tube 12. Moreover, the second end 20 has a diameter that is greater than a diameter of the tubular portion 26 of the tube 12 to capture water for watering the plant bulb 18.

A cage 32 is coupled to the tube 12 and the cage 32 is exposed when the tube 12 is inserted into the ground 16. In this way the cage 32 inhibits rodents from entering the tube 12 from above the ground 16. The cage 32 has a bottom edge 34 and the bottom edge 34 is continuously arcuate about a vertical axis of the cage 32 such that the bottom edge 34 forms a circle. The cage 32 curves upwardly from the bottom edge 34 such that the cage 32 forms a dome. Additionally, the bottom edge 34 of the cage 32 is coupled to the distal edge 30 of the vertical portion 28 of the outer wall 22 of the tube 12. The cage 32 has an opening 36 extending through an apex of the cage 32.

A retainer 38 is coupled to the tube 12 and the retainer 38 extends outwardly from the outer wall 22 of the tube 12. The retainer 38 is positioned on the tubular portion 26 of the tube 12 and the retainer 38 has an aperture 39 extending through the retainer 38. A grapple 40 is movably coupled to the tube 12 and the grapple 40 is positioned on an opposite side of the tube 12 with respect to the retainer 38.

A plurality of the tubes 12 can each be inserted into the ground 16 to protect a plurality of plant bulbs 18. The grapple 40 releasably engages the retainer 38 on an adjacent one of the tubes 12 with respect to the tube 12 on which the grapple 40 is positioned. In this way the plurality of tubes 12 can be attached together. The grapple 40 is positioned on the tubular portion 26 of the outer wall 22 of the tube 12 and the grapple 40 has a distal end 42 with respect to the outer wall 22. The grapple 40 is curved adjacent to the distal end 42 and the distal end 42 is inserted through the aperture 39 in the retainer 38 on the tube 12 that is positioned adjacent to the tube 12 on which the grapple 40 is positioned.

In use, the plant bulb 18 is planted and the tube 12 is inserted into the ground 16 such that the first end 14 of the tube 12 surrounds the plant tube 12. In this way the tube 12 protects the plant bulb 18 from being accessible to rodents or other animals that eat plant bulbs. Additionally, the cage 32 is spaced above the ground 16 when the tube 12 is inserted into the ground 16. In this way the cage 32 inhibits rodents from entering the tube 12 from above. The tube 12 is removed from the ground 16 when the plant bulb 18 has sprouted thereby allowing the plant to fully grow. A plurality of the tubes 12 can be each positioned in the ground 16 next to each other to protect a plurality of plant bulbs 18. The grapple 40 on each tube 12 is inserted into the retainer 38 on an adjacent one of the tubes 12 to couple the plurality of tubes 12 together.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A plant bulb protection system comprising:
   a plant bulb;
   a tube having a first end being tapered wherein said first end is configured to penetrate ground, said tube having an inside diameter wherein said tube is configured to surround the plant bulb when said tube is inserted into ground, said tube being comprised of a material wherein said tube is configured to inhibit being chewed or otherwise penetrated by a rodent thereby protecting the plant bulb from being eaten by the rodent;
   a cage being coupled to said tube, said cage being exposed when said tube is inserted into the ground wherein said cage is configured to inhibit rodents from entering said tube from above the ground;
   a retainer being coupled to said tube;
   a grapple being movably coupled to said tube, said grapple being positioned on an opposite side of said tube with respect to said retainer, said grapple configured to releasably engage another retainer on an adjacent tube with respect to said tube on which said grapple is positioned.

2. The system according to claim 1, wherein:
   said tube has a second end and an outer wall extending between said first and second ends, said outer wall angling inwardly adjacent to said first end;
   said outer wall has a horizontal portion being oriented perpendicular to and extending outwardly from a tubular portion of said tube, said horizontal portion being spaced from said second end;
   said outer wall has a vertical portion extending upwardly from said horizontal portion, said vertical portion having a distal edge with respect to said horizontal portion defining said second end of said tube, said second end having a diameter being greater than a diameter of said tubular portion of said tube wherein said second end is configured to capture water for watering the plant bulb.

3. The system according to claim 2, wherein said cage has a bottom edge, said bottom edge being continuously arcuate about a vertical axis of said cage such that said bottom edge forms a circle, said cage curving upwardly from said bottom edge such that said cage forms a dome, said bottom edge of said cage being coupled to said distal edge of said vertical portion of said outer wall of said tube, said cage having an opening extending through an apex of said cage.

4. The system according to claim 2, further comprising said retainer extending outwardly from said outer wall of said tube, said retainer being positioned on said tubular portion of said tube, said retainer having an aperture extending through said retainer.

5. The system according to claim 4, wherein said grapple being positioned on said tubular portion of said outer wall of said tube, said grapple having a distal end with respect to said outer wall, said grapple being curved adjacent to said distal end, said distal end being inserted through said aperture in said retainer on said tube being positioned adjacent to said tube on which said grapple is positioned.

6. A plant bulb protection system comprising:
   a plant bulb;
   a tube having a first end being tapered wherein said first end is configured to penetrate ground, said tube having an inside diameter wherein said tube is configured to surround the plant bulb when said tube is inserted into ground, said tube being comprised of a material wherein said tube is configured to inhibit being chewed or otherwise penetrated by a rodent thereby protecting the plant bulb from being eaten by the rodent, said tube having a second end and an outer wall extending between said first and second ends, said outer wall angling inwardly adjacent to said first end, said outer wall having a horizontal portion being oriented perpendicular to and extending outwardly from a tubular portion of said tube, said horizontal portion being spaced from said second end, said outer wall having a vertical portion extending upwardly from said horizontal portion, said vertical portion having a distal edge with respect to said horizontal portion defining said second end of said tube, said second end having a diameter being greater than a diameter of said tubular portion of said tube wherein said second end is configured to capture water for watering the plant bulb;

a cage being coupled to said tube, said cage being exposed when said tube is inserted into the ground wherein said cage is configured to inhibit rodents from entering said tube from above the ground, said cage having a bottom edge, said bottom edge being continuously arcuate about a vertical axis of said cage such that said bottom edge forms a circle, said cage curving upwardly from said bottom edge such that said cage forms a dome, said bottom edge of said cage being coupled to said distal edge of said vertical portion of said outer wall of said tube, said cage having an opening extending through an apex of said cage;

a retainer being coupled to said tube, said retainer extending outwardly from said outer wall of said tube, said retainer being positioned on said tubular portion of said tube, said retainer having an aperture extending through said retainer;

a grapple being movably coupled to said tube, said grapple being positioned on an opposite side of said tube with respect to said retainer, said grapple configured to releasably engage another retainer on an adjacent tube with respect to said tube on which said grapple is positioned, said grapple being positioned on said tubular portion of said outer wall of said tube, said grapple having a distal end with respect to said outer wall, said grapple being curved adjacent to said distal end, said distal end insertable through an aperture in said another retainer on said adjacent tube when positioned adjacent to said tube on which said grapple is positioned.

* * * * *